3 Sheets--Sheet 1.

W. B. GLOVER.
Improvement in Stereoscopes.

No. 127,231. Patented May 28, 1872.

WITNESSES.
Villette Anderson
G. E. Upham.

INVENTOR.
Winslow B. Glover
Chipman Hosmer
Attys

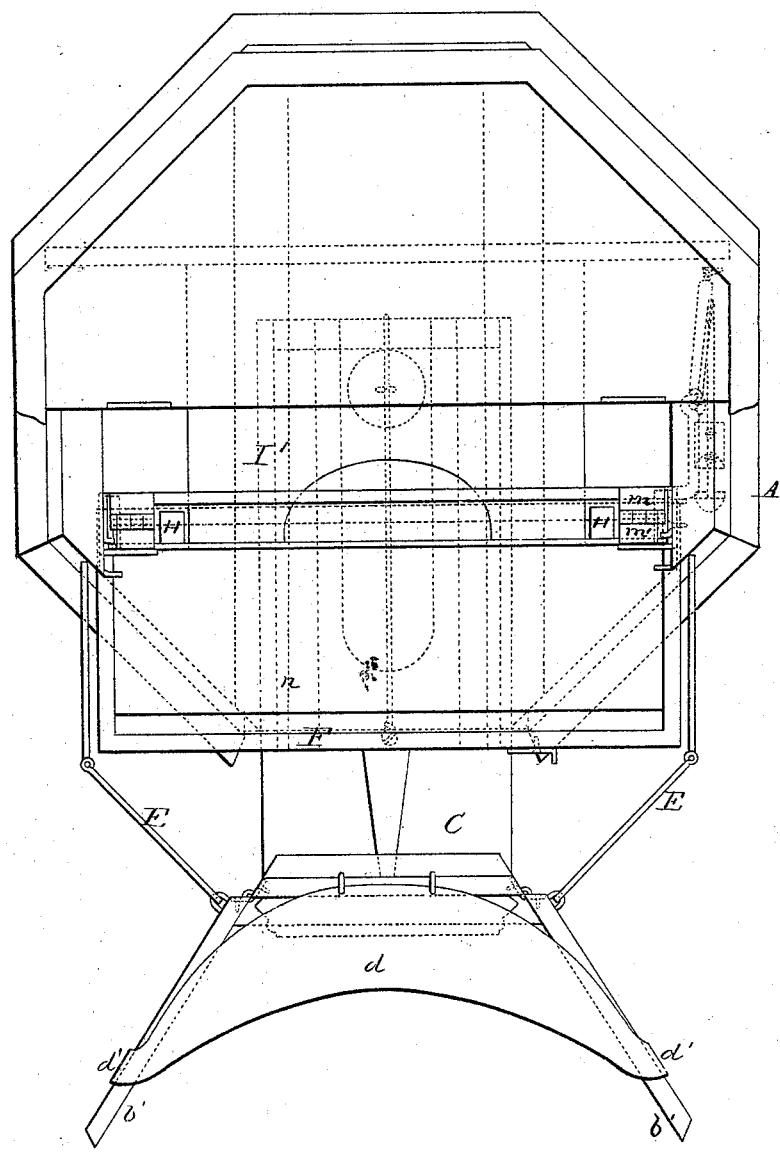

W. B. GLOVER.
Improvement in Stereoscopes.

No. 127,231.

3 Sheets--Sheet 3.

Patented May 28, 1872.

WITNESSES.
Villette Anderson
G. E. Upham.

INVENTOR.
Winslow B. Glover,
Chipman Hosmer & Co,
Attys.

UNITED STATES PATENT OFFICE.

WINSLOW B. GLOVER, OF BOSTON, MASSACHUSETTS.

IMPROVEMENT IN STEREOSCOPES.

Specification forming part of Letters Patent No. 127,231, dated May 28, 1872.

*To all whom it may concern:*

Be it known that I, WINSLOW B. GLOVER, of Boston, in the county of Suffolk and State of Massachusetts, have invented a new and valuable Improvement in Stereoscopes; and I do hereby declare that the following is a full, clear, and exact description of the construction and operation of the same, reference being had to the annexed drawing making a part of this specification, and to the letters and figures of reference marked thereon.

Figures 1, 4:
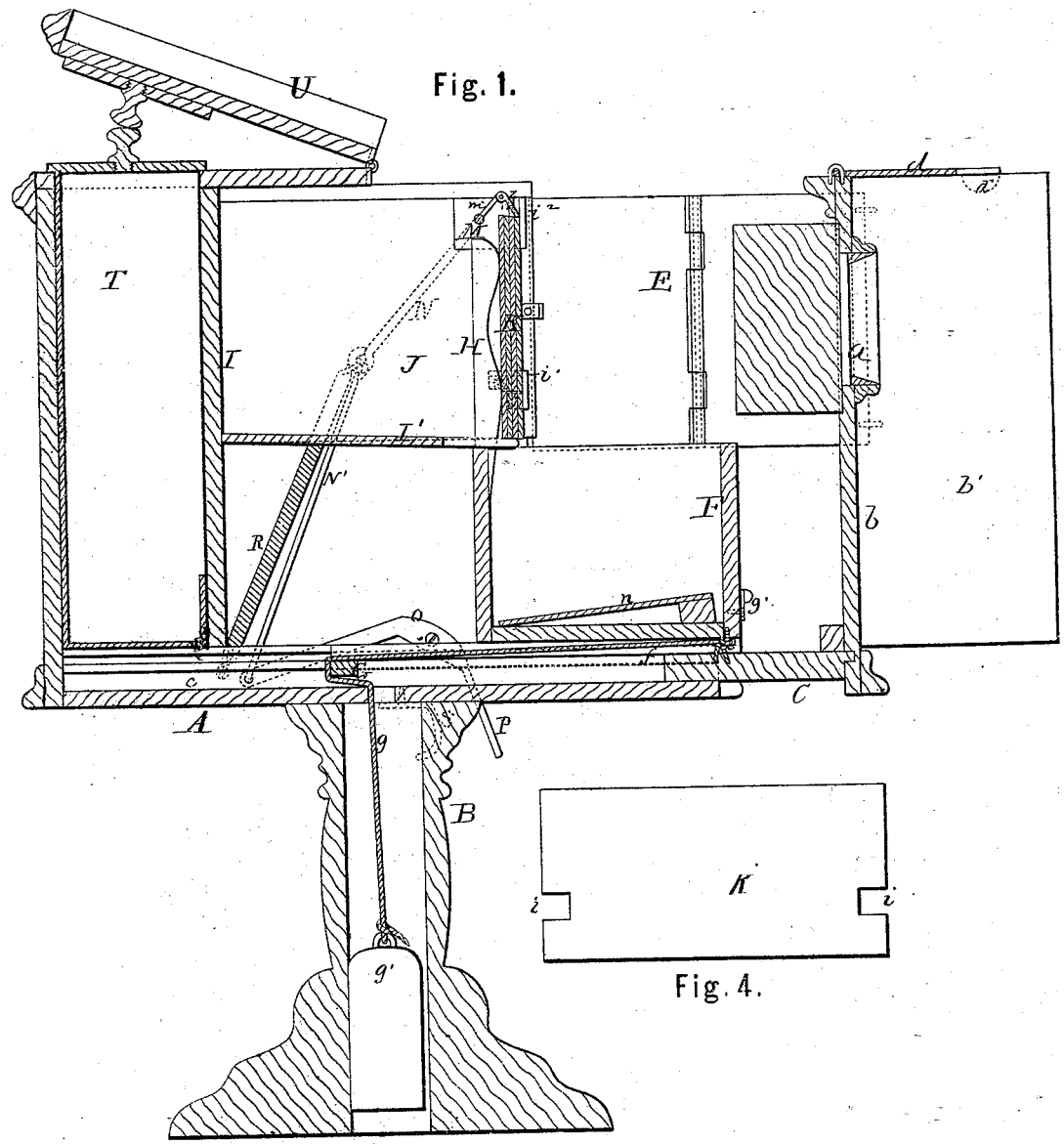
Figure 3:
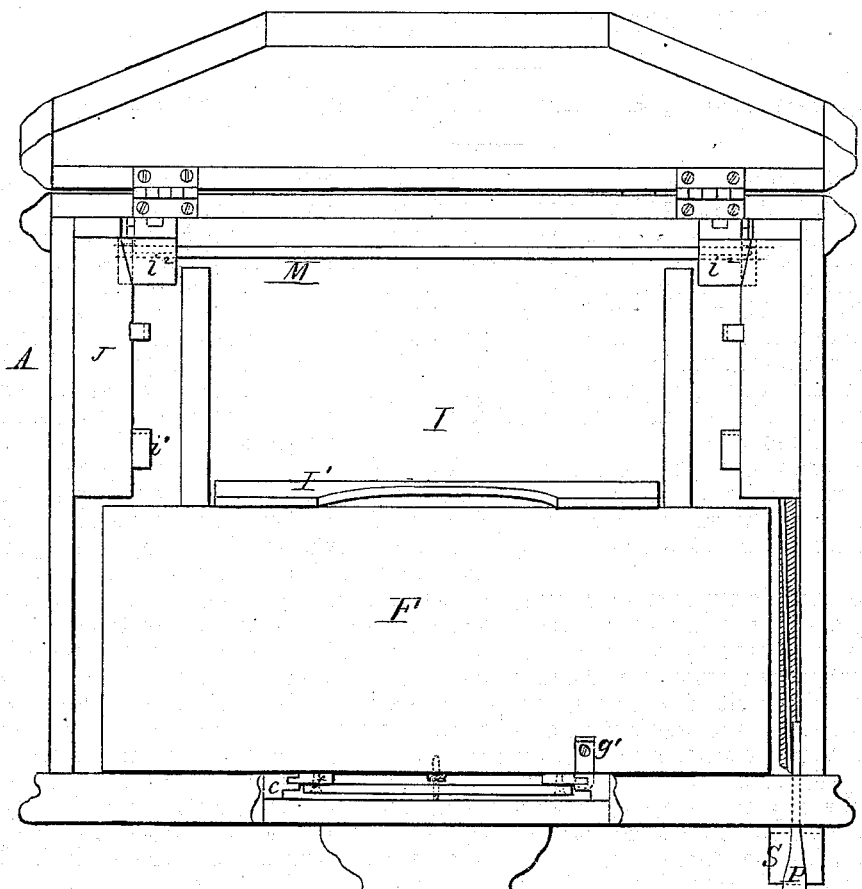
Figure 5:
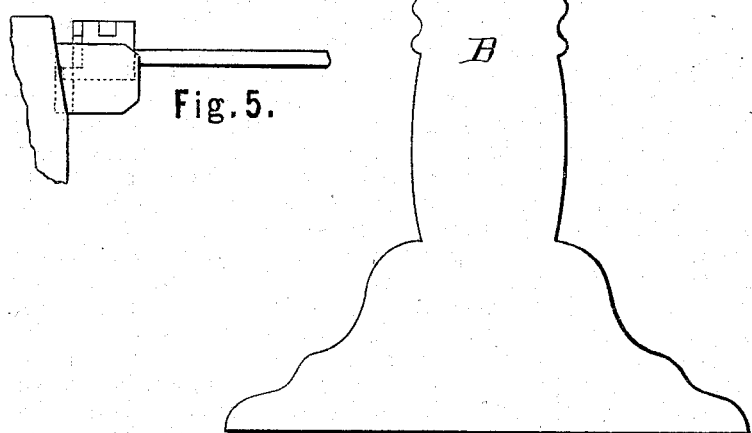

Figure 1 of the drawing is a representation of a vertical central section of my invention. Fig. 2 is a top view of the same. Fig. 3 is a front view of the same. Fig. 4 is a detail view of the same.

This invention has relation to stereoscopes; and the novelty consists in the construction and arrangement of certain parts, as hereinafter described, whereby provision is made for holding the views in a position to be seen, reflecting the light thereon, producing them successively, and for their reception into a drawer as they are dropped out of view.

Referring to the drawing, A represents an octagonal-shaped stereoscope-box mounted on a hollow pedestal, B. The side $b$ holding the lenses $a$, and the two adjacent sides $b'$ $b'$, are hinged together, and are disconnected from the rest of the box. To the bottom of the lens side is attached a slide, C, which moves between guides $c$ secured to the bottom of the box A. By means of this slide the lenses are adjusted to the proper focus. When the front of the box, comprising the three sides referred to, is drawn out the two hinged sides are turned out and back so as to form shades to the eyes. In this position said sides are held by means of a hinged plate, $d$, having lugs $d'$ at its ends, which clasp the sides in the manner shown in the drawing. A two-leaved folding reflector, E, is hinged to each one of the sides $b'$, and is adjusted according to requirement. F designates a drawer, to the bottom of which are attached two flanged slides, $f$, adapted to move between the guides $c$, which are grooved properly to receive them. These slides extend beyond the back of the drawer, and are connected by means of a transverse bar, G. A cord, $g$, holding a weight, $g^1$, which moves within the hollow of the pedestal B, passes behind and over the bar G, and is attached to a pin at the front of the drawer. The weight $g^1$ serves to move the drawer forward when the front of the stereoscope is pulled out. A catch, $g^2$, pivoted to the front of the drawer, fits a notch in one of the guides $c$, and serves to prevent the drawer from moving until desired. Attached to the back part of the drawer are two vertical standards, H, which are used for the purpose of supporting the views, as hereinafter described. Behind the drawer is a partition, I, from which projects a shelf, I'. When the drawer is moved the standards pass on either side of said shelf. Lateral walls J also project from said partition. The views shown at K are, for observation, placed edgewise upon the shelf I', a number of them at a time. A short distance from the lower edge of each view notches $i$ are made to receive the upper part of the metallic guards $i^1$, which are of the shape of an inverted letter L. As each view is exposed the face of the card touches the vertical parts of the guards $i^1$. The face of the exposed card at the same time touches the upper guards, shown at $i^2$. The cards are pressed forward by the standards H. M designates a horizontal rod located behind the guards $i^2$ and journaled to the walls J. This rod is armed with wings $m$ $m'$, which are hinged together in pairs, one of each pair being secured to the rod near its end. The wings $m$ touch the guards $i^2$, and their lower edges rest on the exposed card. N designates an arm, attached to one end of the rod M at a right angle thereto. This arm passes down through a recess in one of the walls J, and is coupled to another arm, N', which, being extended in the direction shown in Fig. 1 of the drawing, is attached to an elbow-lever, O, having a thumb-plate P, which projects through an opening in the bottom of the stereoscope. By pressing against the thumb-piece P the plate or wing $m$ of the hinges $m$ $m'$ is depressed and one of the view-cards pushed into the drawer below, where it lies on an inclined board, $n$. The object of the board is to cause the views to fall one way, and to keep them in such a position that they may be easily taken out of the drawer. After the moving of the rod M by means of the lever O it is brought back to its former position by means of a spring, R, attached to the arm N. S represents a finger-hook, to be taken hold of in order to give purchase in moving the lever O. T represents a drawer in which to hold views, when not in use, or other articles. U indicates a hinged lid, which is thrown back when the stereoscope is to be used. Directly behind the guides $i^2$ are others, $z$, parallel thereto, and separated by space through which the wing $m$ of each of the devices $m\ m'$ travels in a vertical direction. The object of this space is to guide the wing $m$ and allow it to press on but one card at a time.

What I claim as my invention, and desire to secure by Letters Patent, is—

1. The lateral folding reflectors E, hinged to the sides $b'$ of an extensible stereoscope, substantially as and for the purpose specified.

2. The drawer F, standards H, slides $f$, guides $c$, bar G, cord $g$, and weight $g^1$, in combination with the guides $i\ i^1$, transverse bar M, and hinges or lugs $m\ m'$, substantially as specified.

3. The elbow-lever O, rods N N', and spring R, in combination with the rod M, substantially as and for the purpose specified.

4. The view-cards K, having the notches $i$, in combination with the guards $i^1$ and the depressing-fingers $m\ m'$, substantially as described.

5. The combination, with the horizontally-sliding parts H, of the guides $i^1\ i^2\ z$, the rock-shaft, with its hinge-plate. fingers $m\ m'$, and the notched stereoscopic card, substantially as specified.

In testimony that I claim the above I have hereunto subscribed my name in the presence of two witnesses.

WINSLOW B. GLOVER.

Witnesses:
ANNIE E. GLOVER,
MARY P. JONES.